Dec. 10, 1963 R. E. ALLEN ETAL 3,114,066

TRANSPARENT HIGH DIELECTRIC CONSTANT MATERIAL, METHOD AND ELECTROLUMINESCENT DEVICE

Filed Jan. 10, 1962

INVENTORS
RICHARD E. ALLEN
AND ANDREW HERCZOG

BY Clarence R. Patty, Jr.
ATTORNEY

United States Patent Office 3,114,066
Patented Dec. 10, 1963

3,114,066
TRANSPARENT HIGH DIELECTRIC CONSTANT MATERIAL, METHOD AND ELECTROLUMINESCENT DEVICE

Richard E. Allen, Corning, and Andrew Herczog, Painted Post, N.Y., assignors to Corning Glass Works, Corning, N.Y., a corporation of New York Filed Jan. 10, 1962, Ser. No. 165,395
6 Claims. (Cl. 313—108)

This invention relates to novel glass compositions and to methods by which glasses can be thermally transformed into transparent, semicrystalline bodies possessing high dielectric constants.

High dielectric constant materials are particularly desirable for use in electrical devices such as capacitors and electro-luminescent cells. For such purposes it is usually advantageous to form and utilize such materials in thin strips or ribbons. Most materials which have heretofore been utilized because of their high dielectric properties have been crystalline ceramics which are formed to their desired shape and size by conventional ceramic pressing and sintering techniques. Such forming process limits the minimum thickness obtainable both because of the inherent limitations of the process and because the porosity of the final ceramic requires that additional thickness be provided to preclude premature voltage breakdown.

In a co-pending application, Serial No. 30,413, filed May 18, 1960, by Andrew Herczog and Stanley D. Stookey and assigned to the same assignee as the present application, there is described a method of making high dielectric constant semi-crystalline materials by thermal conversion of suitable glasses. While such materials are eminently suitable in applications not requiring transparency, high dielectric constant materials which can be made in the form of plates, beads, or continuous, thin ribbon and which are also transparent, are particularly suitable in electroluminescent and other photo-electric devices.

High dielectric constant and optical transparency are properties of some single crystal materials such as barium titanate, alkali niobates, or rutile; but limitations in size and obtainable shape as well as cost forbid their use for most applications. On the other hand, glasses, although they can be readily formed and have the requisite transparency to visible radiation, have relatively low dielectric constants.

The principal object of this invention is to provide a transparent semicrystalline material which possesses a dielectric constant at least 50% higher than the dielectric constant of a glass having identical composition on the oxide basis.

Another object of this invention is to provide a method for making materials which are transparent and possess high dielectric constants.

A further object is to provide a new composition of matter which is semicrystalline and has a high refractive index.

A still further object of this invention is to provide an electroluminescent cell in which light is emitted from both surfaces thereof.

Another object of this invention is to provide a novel glass composition which can be thermally converted to a transparent semicrystalline material having a dielectric constant of about 60 to 800, when measured at 1000 cycles per second at 25° C.

Figure 1:
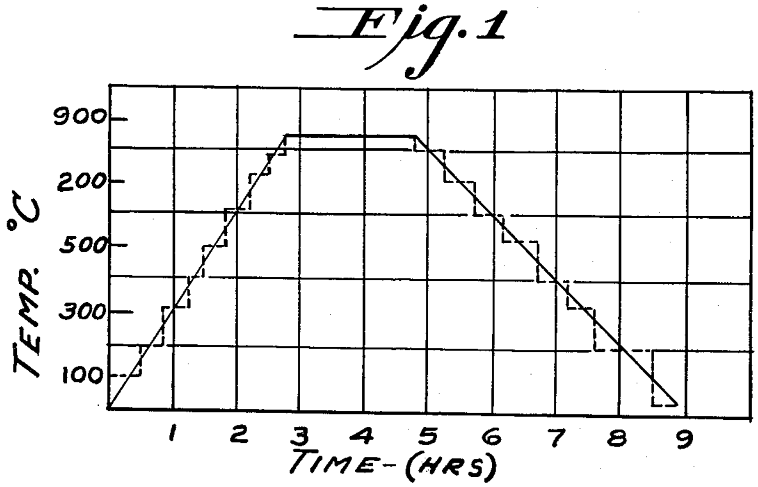

FIG. 1 is a graph of temperature versus time which illustrates the preferred embodiment of the method of heat-treatment according to the present invention.

Figure 2B:
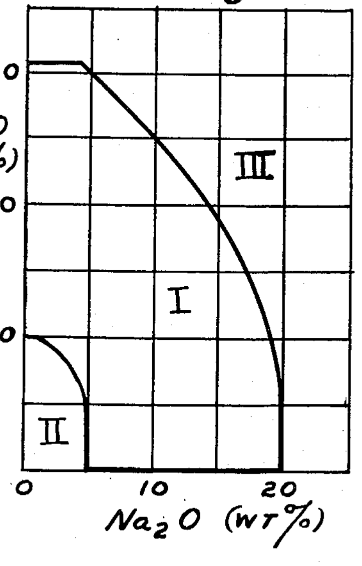
Figure 2A:
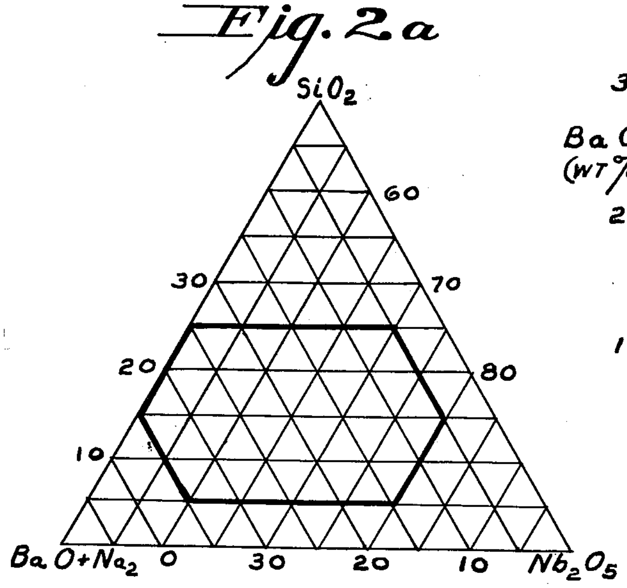

FIG. 2*a* is a graph showing the glass compositions of the invention; FIG. 2*b* shows the inter-relationship in the permissible ranges of the two constituents which are alternatively essential in such compositions.

Figure 3:
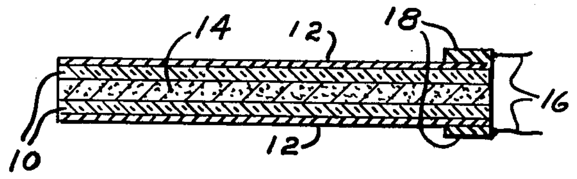

FIG. 3 shows in cross-section one configuration of an electroluminescent cell made in accordance with this invention.

We have found that the principal object of this invention can be obtained by heat-treating an article of glass having a composition hereinafter more fully described by heating the article at a rate of up to 1000° C. per hour to a temperature of 700°–950° C., maintaining the article in said temperature range until the dielectric constant has increased by at least 50%, preferably for a time of between about 1 hour and 24 hours, and thereafter cooling the article to room temperature at a rate of up to 500° C. per hour. We have found that such heat treatment causes precipitation of a multiplicity of submicroscopic, crystalline niobate particles within the remaining glassy matrix which causes a substantial increase in the dielectric constant of the material, but that the refractive index of the crystal is sufficiently close to that of the remaining glass, and the crystal size is so small, substantially all the crystals being less than 1000 A. in diameter, that the article retains a very substantial transparency to visible radiation.

The heat treatment must be controlled within the above defined ranges in order to achieve the desired properties in the resultant product. Thus, the glass must not be heated to the crystallization range at a temperature in excess of 1000° C. per hour, as it becomes opaque if greater heating rates are utilized. There does not appear to be any minimum heating rate, but from a practical standpoint heating rates of less than 50° C. per hour are too costly to be used for commercial purposes.

A preferred heat treatment for the compositions of this invention is shown in FIG. 1 and comprises heating the glass from room temperature (25° C.) to 850° C. at a rate of about 300° C. per hour, maintaining it at 850° C. for 2 hours, and cooling it to room temperature at a rate of 200° C. per hour. Of course, it is obvious that in place of utilizing uniform heating and cooling rates, it is possible to achieve the same result by step-wise increases or decreases in temperature, as would be done in a continuous, zoned heat-treatment furnace, wherein the steps would approximate the curve of uniform changes in temperatures. Such a step-wise heat treatment, approximating the preferred schedule, is shown by the broken line in FIG. 1.

Glasses which are suitable for practicing our invention comprise on the oxide basis as calculated from the batch in weight percent 5–25% $SiO_2$, 50–80% $Nb_2O_5$, 0–20% $Na_2O$, 0–31% BaO, the total amount of $Na_2O$ and BaO being about 5–35%, and the total amount of $SiO_2$, $Nb_2O_5$, $Na_2O$, and BaO being at least 90% on a molar basis. Furthermore, the $Na_2O$ must be at least 5% when baria is absent and the glass must contain some $Na_2O$ when the baria content is below 10% and BaO content must be slightly limited when the amount of $Na_2O$ is within the higher portion of its permissible range as is hereinafter more fully explained.

FIG. 2*a* illustrates on a ternary diagram the limits in weight percent of the essential ingredients of the composition of this invention; the total BaO and $Na_2O$ being treated as a single constituent; at least one of the two being essential.

These ranges are critical in view of the fact that compositions which contain more than 25% $SiO_2$ become opaque when subjected to a heat treatment suitable for the formation of the desired crystalline condition within the glassy matrix. Compositions containing less than 5% of $SiO_2$ or more than 80% $Nb_2O_5$ cannot be cooled rapidly enough to form a glass. In fact, glasses of these compositions can only be formed in thin sections by cooling by contact with a metal surface or rapidly quenching in a liquid or in air to form powdered glass or small glass beads. At least 50% of $Nb_2O_5$ is required to produce sufficient crystallization upon heat treatment to achieve the desired dielectric constant.

It is also necessary that the glass contain a sufficient amount of the oxides of metals which forms niobate crystals in the indicated proportion selected from the group consisting of 5–20% soduim oxide, 10–31% BaO, and 5–35% of $Na_2O$ plus BaO, the amounts of $Na_2O$ and BaO in combination being shown in FIG. 2*b* and being more particularly described hereinafter, in order to produce sufficient crystallization of the desired niobate crystals upon heat treatment to achieve the desired dielectric constant. Amounts of $Na_2O$ and BaO, individually or in combination which are in excess of the amounts stated produce an increasingly opaque material.

When the amount of sodium oxide is near its maximum range, that is about 15–20%, the amount of barium oxide must be limited, as shown by the graph in FIG. 2*b*, on which is plotted the permissible range of BaO content as a function of the $Na_2O$ content and vice versa, to prevent opacification of the material. On the other hand, sodium oxide must be present when the baria content is less than about 10% as is shown in FIG. 2*b*, in order to obtain the requisite crystallinity in the final material upon heat treatment. Thus, while either 5% of $Na_2O$ or 10% of BaO individually is required, glasses which contain less than 10% BaO require a substantial amount of $Na_2O$. To summarize this relationship between the amount of BaO and $Na_2O$ necessary in the glasses of this invention, glasses wherein the proportion of BaO to $Na_2O$ falls within the area designated I of FIG. 2*b* are suitable for the purposes of this invention whereas glasses which contain these oxides in that proportion falling within the area designated II cannot be heat treated to produce the requisite crystallinity and those falling within the area designated III opacify upon heat treatment.

In order to obtain the desired transparency and dielectric constant of the heat-treated product, the predominant crystalline phase which is precipitated in the glassy matrix must be sodium niobate and/or barium meta-niobate. Sodium niobate is preferable as it results in a higher dielectric-constant material than barium meta-niobate. The formation of crystals of niobate other than niobates of sodium or barium must be prevented or kept to a small amount; this is accomplished by limiting the amount of the oxides of such other cations which form niobates. The introduction of such cations in limited amounts serves several useful purposes such as increase of dielectric constant, modification of the dielectric constant versus temperature relationship, lowering of dissipation factor and improvement of glass-forming characteristics. In general most mono-, di-, and tri-valent cations can be substituted for sodium and barium ions in the crystal lattices, which are of the type known as the oxygen octahedral lattice, in small amount as modifiers. These include group I and II elements of the periodic system having atomic numbers less than 60, group III–*a* elements including the rare earth group, and lead and bismuth. In a similar fashion tetra-, penta-, and hexa-valent cations of an ionic radius greater than 0.6 angstrom and capable of forming oxides stable at those valencies can be substituted for niobium ions. Substitution of mono-, di-, and tri-valent cations for sodium and/or barium ions of the basic composition is done on molar equivalent basis; that is, one molecule of a mono-valent cation can replace one ion of soidum or two such cations can replace one ion of barium, one divalent cation can replace one ion of barium or two ions of sodium, and one trivalent cation can replace three ions of sodium or two such cations can replace three ions of barium. The substitution of the higher valency cations for niobium, on the other hand, is done on an ion-for-ion basis, the electrical inequality thereby possibly being introduced being apparently compensated for by changes in valency of some of the ions in the glass structure or some similar mechanism.

Besides the oxygen octahedral lattice modifiers other oxide additions serve the useful purpose of improving glass-forming characteristics or of producing coloration or fluorescence in the transparent high dielectric constant material. These additions are used in minor amounts and can be simply added to the basic composition.

Thus, suitable compositions may consist entirely of $SiO_2$, $Nb_2O_5$, and $Na_2O$ and/or BaO, within the above-defined ranges, and also may include up to 10 cationic mole percent of a wide variety of other metallic oxides.

Table I shows composition and constituents in a comprehensive fashion:

*Table I*

Total primary constituents: 90–100 cationic mole percent.
Composition:
5–25 wt. percent $SiO_2$
50–80 wt. percent $Nb_2O_5$
Total 5–35 wt. percent:
0–20 wt. percent $Na_2O$
0–30 wt. percent BaO
Optional constituents: Total of 0–10 cationic mole percent.

| Oxygen-octahedra lattice modifiers | | | | | | Glass Formers | Colorants etc. |
|---|---|---|---|---|---|---|---|
| $M^{+}O_{.5}$ | $M^{2+}O$ | $M^{3+}O_{1.5}$ | $M^{4+}O_2$ | $M^{5+}O_{2.5}$ | $M^{6+}O_3$ | | |
| $LiO_{.5}$ | BeO | $ScO_{1.5}$ | $TiO_2$ | $VO_{2.5}$ | $MoO_3$ | $GeO_2$ | $CrO_{1.5}$ |
| $NaO_{.5}$ | MgO | $YO_{1.5}$ | $ZrO^2$ | $Ta_{2.5}$ | $WO^3$ | $PO_{2.5}$ | $FeO_{1.5}$ |
| $KO_{.5}$ | CaO | $\sum_{57}^{71} O^{*}_{1.5}$ | $SnO_2$ | | | $AsO_{2.5}$ | CoO |
| $RbO_{.5}$ | SrO | $BiO_{1.5}$ | $HfO_2$ | | | $SbO_{2.5}$ | NiO |
| $CsO_{.5}$ | BaO | | $ThO_2$ | | | $AlO_{1.5}$ | $MnO_{1.5}$ |
| $CuO_{.5}$ | ZnO | | | | | $InO_{1.5}$ | $UO_2$ |
| $AgO_{.5}$ | CdO | | | | | $GaO_{1.5}$ | |
| | PbO | | | | | $TeO_2$ | |

*Rare earth group.

The maximum amount of each group of optional constituent which should be utilized varies with the maximum limit being indicated by the decrease in transparency of the resultant semi-crystalline material. Lattice modifiers have maximum concentrations ranging up to 10 cationic mol percent, glass-formers can be used up to about 4 cationic mol percent and colorants up to 1 cationic mol percent. The simultaneous use of several optional constituents influences the maximum value of each and, therefore, the total of all such optional constituents should not exceed 10 cationic mol percent.

Examples which are illustrative of suitable compositions of the basic system, without optional constituents, are set forth on the oxide basis in percent by weight in Table II; other examples, which include optional constituents, in Table III on the oxide basis in both weight and cationic mol percent. Additionally, the dielectric constant of the glass and the ceramic material, resulting from heat treating the glass according to the preferred method illustrated in FIG. 1, as measured at 25° C. at a frequency of 1 kilocycle, are set forth where they have been measured. Dielectric constants of the corresponding non-devitrified glasses range between 30 and 60. Refractive index of the glasses range between 1.8 and 2.0 and of the transparent ceramic between 1.9 and 2.2.

*Table II*

| Wt. | Percent | | | | | | |
|---|---|---|---|---|---|---|---|
| | 1 | 2 | 3 | 4 | 5 | 6 | 7 |
| $SiO_2$ | 14.0 | 12.1 | 20.0 | 9.5 | 9.5 | 11.8 | 13.7 |
| $NaO_{.5}$ | 16.0 | 10.4 | 15.1 | ------ | 2.5 | 9.7 | 14.5 |
| BaO | ------ | ------ | ------ | 30.6 | 25.7 | 9.7 | 3.6 |
| $NbO_{2.5}$ | 70.0 | 77.5 | 64.9 | 59.9 | 62.3 | 68.8 | 68.2 |
| K | 340 | 185 | 319 | 50 | 220 | 290 | 194 |
| L. T. percent | 1.6 | 1.1 | 1.4 | 0.1 | 0.3 | 2.9 | 1.2 |

*Table III*

| | 8 | | 9 | | 10 | | 11 | |
|---|---|---|---|---|---|---|---|---|
| | Wt Percent | CM Percent | Wt Percent | CM Percent | Wt Percent | CM Percent | Wt Percent | CM Percent |
| $SiO_2$ | 15.0 | 23.4 | 19.9 | 30.0 | 17.1 | 24.0 | 13.5 | 18.6 |
| $NaO_{.5}$ | 9.0 | 27.0 | 8.4 | 24.6 | 11.9 | 32.3 | 14.3 | 38.0 |
| $NbO_{2.5}$ | 63.0 | 44.2 | 59.4 | 40.4 | 66.7 | 42.1 | 67.2 | 41.6 |
| PbO | 13.0 | 5.4 | 12.3 | 5.0 | 4.3 | 1.6 | ------ | ------ |
| $BiO_{1.5}$ | ------ | ------ | ------ | ------ | ------ | ------ | 5.0 | 1.8 |
| K | 213 | | 165 | | 270 | | 364 | |
| L. T. Percent | 1.2 | | 1.7 | | 2.1 | | 2.5 | |

| | 12 | | 13 | | 14 | | 15 | |
|---|---|---|---|---|---|---|---|---|
| | Wt Percent | CM Percent | Wt Percent | CM Percent | Wt Percent | CM Percent | Wt Percent | CM Percent |
| $SiO_2$ | 20.5 | 30.2 | 20.0 | 25.2 | 13.8 | 18.5 | 13.9 | 18.6 |
| $NaO_{.5}$ | 8.7 | 24.7 | 15.4 | 37.2 | 14.6 | 38.0 | 14.7 | 38.0 |
| $NbO_{2.5}$ | 61.4 | 40.0 | 62.6 | 35.7 | 68.6 | 41.6 | 69.0 | 41.6 |
| $LaO_{1.5}$ | 9.4 | 5.1 | ------ | ------ | ------ | ------ | ------ | ------ |
| $TiO_2$ | ------ | ------ | 2.0 | 1.9 | ------ | ------ | ------ | ------ |
| CdO | ------ | ------ | ------ | ------ | 3.0 | 1.9 | ------ | ------ |
| SrO | ------ | ------ | ------ | ------ | ------ | ------ | 2.4 | 1.8 |
| K | 175 | | 243 | | 446 | | 336 | |
| L. T., percent | 1.2 | | 1.5 | | 2 | | 2.2 | |

| | 16 | | 17 | | 18 | | 19 | |
|---|---|---|---|---|---|---|---|---|
| | Wt Percent | CM Percent | Wt Percent | CM Percent | Wt Percent | CM Percent | Wt Percent | CM Percent |
| $SiO_2$ | 13.9 | 18.3 | 14.1 | 18.5 | 13.9 | 18.2 | 13.6 | 18.5 |
| $NaO_{.5}$ | 14.8 | 37.7 | 15.0 | 38.0 | 14.7 | 37.3 | 14.4 | 38.0 |
| $NbO_{2.5}$ | 69.3 | 41.2 | 70.3 | 41.5 | 69.2 | 40.8 | 65.2 | 40.1 |
| CdO | ------ | ------ | ------ | ------ | ------ | ------ | 2.9 | 1.9 |
| CaO | 2.0 | 2.8 | ------ | ------ | ------ | ------ | ------ | ------ |
| BeO | ------ | ------ | 0.6 | 2.0 | ------ | ------ | ------ | ------ |
| $KO_{.5}$ | ------ | ------ | ------ | ------ | 2.2 | 3.7 | ------ | ------ |
| $TaO_{2.5}$ | ------ | ------ | ------ | ------ | ------ | ------ | 3.9 | 1.5 |
| K | 273 | | 272 | | 270 | | 325 | |
| L. T., percent | 2.2 | | 1.4 | | 1 | | 1.9 | |

| | 20 | | 21 | | 22 | | 23 | |
|---|---|---|---|---|---|---|---|---|
| | Wt Percent | CM Percent | Wt Percent | CM Percent | Wt Percent | CM Percent | Wt Percent | CM Percent |
| $SiO_2$ | 14.0 | 18.4 | 13.8 | 18.5 | 12.3 | 18.0 | 13.6 | 18.5 |
| $NaO_{.5}$ | 15.0 | 38.1 | 14.6 | 38.0 | 11.5 | 32.7 | 14.4 | 38.1 |
| $NbO_{2.5}$ | 64.5 | 38.2 | 65.6 | 39.7 | 67.5 | 44.7 | 65.2 | 40.1 |
| CdO | 3.0 | 1.8 | 3.0 | 1.9 | 4.8 | 3.3 | 2.9 | 1.9 |
| $TiO_2$ | 3.5 | 3.5 | ------ | ------ | ------ | ------ | ------ | ------ |
| $ZrO_2$ | ------ | ------ | 3.0 | 1.9 | ------ | ------ | ------ | ------ |
| $ThO_2$ | ------ | ------ | ------ | ------ | 3.9 | 1.3 | ------ | ------ |
| $WO_3$ | ------ | ------ | ------ | ------ | ------ | ------ | 3.9 | 1.4 |
| K | 509 | | 284 | | 500 | | 358 | |
| L.T., percent | 1.4 | | 2 | | 0.9 | | 1.5 | |

*Table III*—Continued

| | 24 | | 25 | | 26 | | 27 | |
|---|---|---|---|---|---|---|---|---|
| | Wt Percent | CM Percent | Wt Percent | CM Percent | Wt Percent | CM Percent | Wt Percent | CM Percent |
| $SiO_2$ | 13.8 | 18.5 | 13.8 | 18.6 | 13.9 | 18.6 | 13.4 | 17.9 |
| $NaO_{.5}$ | 14.6 | 37.9 | 14.6 | 38.1 | 14.8 | 38.2 | 14.2 | 36.8 |
| $NbO_{2.5}$ | 68.6 | 41.5 | 68.6 | 41.7 | 68.4 | 41.1 | 66.2 | 40.0 |
| CdO | 1.0 | 0.6 | 1.0 | 0.6 | 0.9 | 0.6 | 3.0 | 1.9 |
| $TiO_2$ | ------ | ------ | ------ | ------ | ------ | ------ | 2.0 | 2.0 |
| $TeO_2$ | ------ | ------ | 2.0 | 1.0 | ------ | ------ | ------ | ------ |
| $GeO_2$ | ------ | ------ | ------ | ------ | 2.0 | 1.5 | ------ | ------ |
| $PO_{2.5}$ | ------ | ------ | ------ | ------ | ------ | ------ | 1.2 | 1.4 |
| K | 517 | | 492 | | 336 | | 471 | |
| L.T., percent | 2 | | 2 | | 1.4 | | .9 | |

| | 28 | | 29 | | 30 | | 31 | |
|---|---|---|---|---|---|---|---|---|
| | Wt Percent | CM Percent | Wt Percent | CM Percent | Wt Percent | CM Percent | Wt Percent | CM Percent |
| $SiO_2$ | 13.5 | 18.0 | 13.5 | 18.5 | 14.0 | 18.5 | 20.0 | 26.8 |
| $NbO_{2.5}$ | 66.2 | 39.8 | 63.9 | 39.6 | 66.3 | 39.6 | 60.1 | 36.4 |
| $NaO_{.5}$ | 14.3 | 36.8 | 13.0 | 34.6 | 14.1 | 36.1 | 12.1 | 31.4 |
| CdO | 3.0 | 1.8 | 2.9 | 1.9 | 1.9 | 1.2 | 2.9 | 1.9 |
| $TiO_2$ | 2.0 | 2.0 | 2.0 | 2.0 | 2.0 | 2.0 | 1.9 | 1.9 |
| BaO | ------ | ------ | ------ | ------ | ------ | ------ | 3.0 | 1.6 |
| NaF | ------ | ------ | ------ | ------ | 1.0 | 1.9 | ------ | ------ |
| ZnO | ------ | ------ | ------ | ------ | 0.7 | 0.7 | ------ | ------ |
| K | 350 | | 426 | | 528 | | 223 | |
| L.T., percent | 3.6 | | .9 | | 1.6 | | 1 | |

| | 32 | | 33 | |
|---|---|---|---|---|
| | Wt Percent | CM Percent | Wt Percent | CM Percent |
| $SiO_2$ | 8.4 | 15.0 | 12.4 | 18.2 |
| $NaO_{.5}$ | 4.4 | 15.3 | 10.8 | 30.6 |
| $NbO_{2.5}$ | 63.6 | 51.5 | 64.7 | 43.0 |
| BaO | 21.6 | 15.2 | 10.8 | 6.0 |
| $PO_{2.5}$ | 2.0 | 3.0 | ------ | ------ |
| $AlO_{1.5}$ | ------ | ------ | 1.3 | 2.2 |

The glasses of this invention can be produced by compounding batch constituents in the conventional manner and melting the batches in a platinum container at a temperature of about 1350° C. to 1600° C. for a time of about ¼ hour to 4 hours. The molten mass is then cooled to a glass by forming to the article of desired shape, for instance thin ribbon, by quenching it in contact with cold metal. Optionally, the molten mass may be quenched by pouring it into a cold liquid to form particles of glass which can be formed to articles of desired shape by conventional powder-glass-forming techniques and thereafter simultaneously sintered into a unitary structure and converted to the semicrystalline condition by the aforementioned heat-treatment. Optionally the mixed batch or the glass powder is fed through a flame to produce small glass spheres. A suitable batch for producing the preferred glass composition of Example 5 in Table II is as follows, in parts by weight:

| | |
|---|---|
| $Nb_2O_5$ | 93.5 |
| $BaCO_3$ | 50.1 |
| $Na_2CO_3$ (anhydrous) | 6.4 |
| Sand | 14.3 |

The characteristic properties of transparency and high dielectric constant render the present semicrystalline materials of particular utility in construction of electroluminescent cells. The traditional form of electroluminescent cell comprises a layer of electroluminescent phosphor and dielectric binder intermediate electrodes with the entire assembly being supported on a substrate such as a glass plate. In order to avoid the use of relatively heavy substrate materials as well as to avoid catastrophic breakdown due to electrical current channeling through the phosphor layer, it has been proposed to interpose at least one barrier layer of high dielectric constant material between the phosphor and an electrode.

In constructing such a cell, the mixture of phosphor and binder may be applied over one surface of a thin sheet of high dielectric constant material with a film-type electrode being applied to the opposite surface. The second electrode may then be applied either over the phosphor layer or over a second layer of dielectric material which in turn is applied over the phosphor layer. The self-supporting, insulating layers heretofore proposed have generally been opaque sintered ceramic materials, such as the well-known titanates.

FIG. 3 illustrates a preferred type of cell construction, a sandwich type wherein sheets 10 of our transparent semicrystalline material have transparent electrodes 12 applied to their outer surfaces and a layer of electroluminescent material 14 sandwiched between the inner surfaces of sheets 10. Electrodes 12 may be transparent, electroconductive, metal oxide films of the type described in United States Patent No. 2,564,706, e.g., a film comprising 92% tin oxide and 8% antimony oxide.

The electroluminescent material may be any of the conventional phosphor materials, e.g., finely divided, doped ZnS, and may be used either alone or in admixture with a suitable vitreous or plastic binder. When used alone, the electroluminescent material may be embedded in the semicrystalline sheets by heating the sandwich structure in the glass state to a temperature of about 700° C. while applying pressure to the outer surfaces of the sandwich and converting the glass to a semicrystalline body by a subsequent heat treatment. Terminal members 16 are affixed to the electroconductive films by means of a suitable cement 18, such as a silver paste.

When light transmission from only one surface of a cell construction such as that of FIG. 3 is either adequate or required, one of sheets 10 may be composed of a conventional opaque dielectric material while the second sheet is composed of one of the present transparent semicrystalline materials. As indicated above, the opaque sheets may be a sintered dielectric material such as barium titanate with an electrode applied to the outer surface which may be either transparent or opaque as desired.

What is claimed is:

1. A glass composition thermally convertible to a high-dielectric constant transparent semicrystalline material comprising on the oxide basis in percent by weight 5–25% $SiO_2$, 50–80% $Nb_2O_5$, 0–20% $Na_2O$, 0–31% BaO, the amount of $Na_2O$ and BaO totalling between 5% and 35%, the ratio of BaO to $Na_2O$ being as described in area I of FIG. 2*b*, and the total amount of $SiO_2$, $Nb_2O_5$, $Na_2O$ and BaO being at least 90%, computed on a cationic molar basis.

2. The method of making a high dielectric-constant semicrystalline material which comprises melting a batch for a glass consisting essentially on the oxide basis in percent by weight of 5–25% $SiO_2$, 50–80% $Nb_2O_5$, 0–20% $Na_2O$, 0–31% BaO, the total amount of $Na_2O$ and BaO being 5–35%, the ratio of BaO to $Na_2O$ being as described in area I of FIG. 2*b*, and the total amount of $SiO_2$, $Nb_2O_5$, $Na_2O$, and BaO being at least 90% on cationic molar basis, quenching the melt to form a glass, heating the glass at a rate of up to 1000° C. per hour up to the temperature range of about 700° C. to 950° C., maintaining the glass within said temperature range for a period of time sufficient to cause the dielectric constant to be increased by at least 50% through the precipitation of a multiplicity of submicroscopic, crystalline niobate particles therein, and thereafter cooling the resultant material at a rate of up to about 500° C. per hour to room temperature.

3. A transparent semicrystalline body consisting of submicroscopic crystals of an oxygen-octahedral lattic configuration selected from the group consisting of sodium niobate, barium metal-niobate, and mixtures thereof dispersed in a glassy matrix, said crystals being less than 1000 A. in diameter.

4. In an electroluminescent device comprising a sheet of dielectric material, a layer containing an electroluminescent material applied to one surface of the sheet and electrodes applied to opposite surfaces of the assembly, the improvement which comprises a sheet of dielectric material composed of a transparent semicrystalline material as defined in claim 3 and the electrode being applied thereto being transparent.

5. In an electroluminescent device comprising two sheets of dielectric material in parallel relationship having sandwiched therebetween a layer comprising electroluminescent material, each sheet of dielectric material having a film of electroconductive material on the surface thereof opposite the surface contacting the electroluminescent layer, at least one of said electroconductive films being substantially transparent, input and output terminals respectively connected to the electroconducting films, the improvement which comprises at least one of said sheets of dielectric material being a transparent semicrystalline material as defined in claim 3.

6. The method according to claim 2 wherein the time sufficient to cause the dielectric constant to be increased by at least 50% ranges from about 1–24 hours.

References Cited in the file of this patent

UNITED STATES PATENTS

| | | |
|---|---|---|
| 2,887,402 | Ballard | May 19, 1959 |
| 2,989,636 | Lieb | June 20, 1961 |
| 3,000,745 | Cianchi | Sept. 19, 1961 |
| 3,060,041 | Lowenstein | Oct. 23, 1962 |